United States Patent
Aslot et al.

(10) Patent No.: US 8,909,607 B2
(45) Date of Patent: Dec. 9, 2014

(54) CONTEXT SENSITIVE REUSABLE INLINE DATA DEDUPLICATION

(75) Inventors: Vishal Chittranjan Aslot, Austin, TX (US); Adekunle Bello, Austin, TX (US); Brian W. Hart, Austin, TX (US); Robert Wright Thompson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 13/476,453

(22) Filed: May 21, 2012

(65) Prior Publication Data

US 2013/0311432 A1 Nov. 21, 2013

(51) Int. Cl.
*G06F 17/30* (2006.01)
(52) U.S. Cl.
USPC ......................................................... 707/692
(58) Field of Classification Search
CPC .............. G06F 17/30; G06F 17/30156; G06F 17/30581; G06F 3/0641; G06F 17/067
USPC ................. 707/637, 639, 640, 692, 693, 634; 711/108
See application file for complete search history.

(56) References Cited

U.S. PATENT DOCUMENTS

| 7,996,371 | B1 | 8/2011 | Deshmukh |
| 8,051,050 | B2 | 11/2011 | Popovski et al. |
| 2008/0294696 | A1 | 11/2008 | Frandzel |
| 2010/0250501 | A1 | 9/2010 | Mandagere et al. |
| 2011/0040728 | A1* | 2/2011 | Akirav et al. ................. 707/634 |
| 2011/0071989 | A1 | 3/2011 | Wilson et al. |
| 2011/0307447 | A1 | 12/2011 | Sabaa et al. |
| 2012/0166401 | A1* | 6/2012 | Li et al. .......................... 707/692 |
| 2012/0330904 | A1* | 12/2012 | Factor et al. ................... 707/692 |
| 2013/0054540 | A1* | 2/2013 | Factor et al. ................... 707/692 |

OTHER PUBLICATIONS

Youngjin Nam et al., Reliability-Aware Deduplication Storage: Assuring Chunk Reliability and Chunk Loss Severity, 2011 IEEE, 6 pages.*

* cited by examiner

*Primary Examiner* — Jean B Fleurantin
(74) *Attorney, Agent, or Firm* — Garg Law Firm, PLLC; Rakesh Garg; Mark C. Vallone (57) ABSTRACT

A computer identifies a relationship among a subset of a set of data blocks, a basis of the relationship forming a context shared by the subset of data blocks. The computer selects a code data structure from a set of code data structures using the context. The context is associated with the code data structure, and the code data structure includes a set of codes. The computer computes, for a first data block in the subset of data blocks, a first code corresponding to a content of the first data block. The computer determines whether the first code matches a stored code in the code data structure. The computer replaces, responsive to the first code matching the stored code, the first data block with a reference to an instance of the first data block. The computer causes the reference to be stored in a target data processing system.

18 Claims, 6 Drawing Sheets

CONTEXT SENSITIVE REUSABLE INLINE DATA DEDUPLICATION

TECHNICAL FIELD

The present invention relates generally to a method, system, and computer program product for data storage optimization. Particularly, the present invention relates to a method, system, and computer program product for context sensitive reusable inline data deduplication.

BACKGROUND OF THE SPECIFICATIONS

Data originates from a variety of data sources (source, sources). For example, an application executing in a data processing system can originate data that is the result of computations, transactions, or inputs performed using the application. Data storage devices, such as hard disk drives, can also be a source of data.

Data is stored in a variety of data targets (target, targets). For example, a data repository application, such as a database, a data storage device, and a combination thereof are some examples of a target. During a data backup operation, data can originate from one data storage device and be stored in another data storage device that acts as a target.

A data processing environment can have several data streams flowing between one or more sources and one or more targets. Each data stream can include any number of data blocks. A data block includes data of a selected size. A source, a target, or both, treat data in a data block as a unit of data that can be read, written, or transmitted together.

Data storage space or capacity is often limited by a variety of factors in a data processing environment. For example, the expense of adding data storage devices may limit the data storage size in one data processing environment. Even if the cost of data storage devices were not an issue, manageability of the volume of data in a data processing environment can place limits on the data storage capacity. Performance degradation from keeping large data volumes online can be another factor that can artificially limit the data storage capacity.

A variety of data compression techniques is used for storing an amount of data that is larger than a given data storage capacity. Data deduplication is one such technique. Essentially, data deduplication seeks to avoid storing similar data more than once. An offline data deduplication method receives a data stream, holds the data of the data stream in a temporary data storage, identifies duplicate data blocks in the data, retains one instance of the duplicate data blocks, replaces the remaining duplicates of that data block with a reference to the retained instance, and sends the modified data including non-duplicate data blocks an references thereto to a target.

In contrast, an inline data deduplication method does not hold or delay the data stream for later examination and removal of duplicates. An inline data deduplication method examines a data stream as the data stream progresses to a target (inline or in-flight), detects duplicate data blocks, replaces the duplicates with references to one instance of the repeating data block, and allows the data stream to continue to the target.

Some presently available methods for inline data deduplication require prior knowledge of the structure of the data to be able to determine whether certain data blocks are duplicates of one another. Some other inline data deduplication methods require certain organization of data, such as from or to a certain file or directory, to perform a two-step deduplication—first removing duplicate data structures, such as duplicate files, and then analyzing the data blocks for duplicate data blocks in the remaining data.

SUMMARY OF THE INVENTION

The illustrative embodiments provide a method, system, and computer program product for inline data deduplication. A method according to one embodiment includes a computer identifying a relationship among a subset of a set of data blocks, a basis of the relationship forming a context shared by the subset of the set of data blocks. The method further includes the computer selecting a code data structure from a set of code data structures using the context, wherein the context is associated with the code data structure, and wherein the code data structure includes a set of codes. The method further includes the computer computing, for a first data block in the subset of data blocks, a first code corresponding to a content of the first data block. The method further includes the computer determining whether the first code matches a stored code in the code data structure. The method further includes the computer replacing, responsive to the first code matching the stored code, the first data block with a reference to an instance of the first data block. The method further includes the computer causing the reference to be stored in a target data processing system.

In at least one embodiment, a computer program product for inline data deduplication is provided. The computer program product includes one or more computer-readable tangible storage devices. The computer program product further includes program instructions, stored on at least one of the one or more storage devices, to identify a relationship among a subset of a set of data blocks, a basis of the relationship forming a context shared by the subset of the set of data blocks. The computer program product further includes program instructions, stored on at least one of the one or more storage devices, to select a code data structure from a set of code data structures using the context, wherein the context is associated with the code data structure, and wherein the code data structure includes a set of codes. The computer program product further includes program instructions, stored on at least one of the one or more storage devices, to compute, for a first data block in the subset of data blocks, a first code corresponding to a content of the first data block. The computer program product further includes program instructions, stored on at least one of the one or more storage devices, to determine whether the first code matches a stored code in the code data structure. The computer program product further includes program instructions, stored on at least one of the one or more storage devices, to replace, responsive to the first code matching the stored code, the first data block with a reference to an instance of the first data block. The computer program product further includes program instructions, stored on at least one of the one or more storage devices, to cause the reference to be stored in a target data processing system.

In at least one embodiment, a computer system for inline data deduplication is provided. The computer system includes one or more processors, one or more computer-readable memories and one or more computer-readable tangible storage devices. The computer system further includes program instructions, stored on at least one of the one or more storage devices for execution by at least one of the one or more processors via at least one of the one or more memories, to identify a relationship among a subset of a set of data blocks, a basis of the relationship forming a context shared by the subset of the set of data blocks. The computer system further includes program instructions, stored on at least one of the one or more storage devices for execution by at least one of the one or more processors via at least one of the one or more memories, to select a code data structure from a set of code data structures using the context, wherein the context is associated with the code data structure, and wherein the code data structure includes a set of codes. The computer system further includes program instructions, stored on at least one of the one or more storage devices for execution by at least one of the one or more processors via at least one of the one or more memories, to compute, for a first data block in the subset of data blocks, a first code corresponding to a content of the first data block. The computer system further includes program instructions, stored on at least one of the one or more storage devices for execution by at least one of the one or more processors via at least one of the one or more memories, to determine whether the first code matches a stored code in the code data structure. The computer system further includes program instructions, stored on at least one of the one or more storage devices for execution by at least one of the one or more processors via at least one of the one or more memories, to replace, responsive to the first code matching the stored code, the first data block with a reference to an instance of the first data block. The computer system further includes program instructions, stored on at least one of the one or more storage devices for execution by at least one of the one or more processors via at least one of the one or more memories, to cause the reference to be stored in a target data processing system.

BRIEF DESCRIPTION OF THE SEVERAL VIEWS OF THE DRAWINGS

The novel features believed characteristic of the invention are set forth in the appended claims. The invention itself, however, including a preferred mode of use, further objectives and advantages thereof, will best be understood by reference to the following detailed description of illustrative embodiments when read in conjunction with the accompanying drawings, wherein:

DETAILED DESCRIPTION OF THE INVENTION

Existing inline data deduplication methods create a hash value for a data block and attempt to match the hash value of the data block with the hash values of other data blocks in the data stream. If the hash value matches, the existing inline data deduplication methods treat the data blocks with matching hash values as duplicates and replace the duplicate data blocks with a reference to one retained instance of the data block.

The illustrative embodiments recognize certain problems with presently available methods for inline data deduplication. For example, for a typical data stream, the size of a hash table storing hash values of data blocks can become unmanageable in an existing inline data deduplication methods. For example, assume a data block size of 4 Kilobytes (KB), and a hash value of size 256 bits. For identifying duplicates in 1 Terabyte (TB) of data, the size of the hash table itself is approximately 8 Gigabytes (GB), which has to be kept in memory for the deduplication to be efficient.

The illustrative embodiments recognize that storing the entire hash table in memory can be problematic due to availability of memory space and limitations on the memory usage of applications. The illustrative embodiments further recognize that storing all or part of the hash table in secondary storage, such as on a hard disk drive, slows down the process of deduplication. The illustrative embodiments also recognize that simply truncating a part of the hash table to reduce the hash table storage space results in existing inline data deduplication missing many duplicate data blocks, causing data storage to inflate.

The illustrative embodiments used to describe the invention generally address and solve the above-described problems and other problems related to data storage optimization using data deduplication. The illustrative embodiments provide a method, system, and computer program product for context sensitive reusable inline data deduplication.

The illustrative embodiments recognize that certain data blocks in a data stream can be related to one another in some respect. The basis of a relationship amongst certain data blocks in a data stream is called a context. Based on the context, an illustrative embodiment can form groups of related data blocks, and treat a group of data blocks in an advantageous manner for inline data deduplication, as described herein.

According to an illustrative embodiment, a basis of a relationship among data blocks, or context, can be a characteristic that is common to the related data blocks. As one example, a context can be a workload that triggers a data stream, the workload being a common characteristic of the data blocks of the resulting data stream. Another example of a context can be a process or thread in a workload that causes data transfer, the process or thread identifier being a common characteristic of the resulting data blocks. Another example of a context can be a source-target pair between which a data stream flows, the source-target pair being a common characteristic of the data blocks of the data stream.

According to an illustrative embodiment, a user, such as an administrator or a system, can specify a context. For example, an administrator can specify that the data blocks in a particular data stream are to be presumed related to one another. An example case where an administrator may make such a specification is when data blocks of a particular job or set of jobs are to be treated together by an embodiment. For example, when many predetermined or runtime-determined sources supply data to many pre-identified targets or targets resolved at run-time, a relationship based on source-target pairing may be ineffective. An administrator may have to specify logic or other conditions according to which an embodiment should regard data blocks as related or belonging to a common context.

An illustrative embodiment can relate data blocks with one another to determine a context, such as by inspecting certain data blocks of a data stream. An illustrative embodiment can relate data blocks with one another to determine a context or an administrator can specify a context for certain data blocks based on a variety of characteristics of the data, data blocks, or the data stream. For example, an embodiment can treat data blocks as belonging to a common context for data occurring at a certain time of day, occurring at a certain frequency, being of a certain size, or including a particular data pattern.

Furthermore, unlike prior art inline data deduplication methods, an embodiment can save and reuse the grouping information, the context information, or the characteristics of data blocks. For example, an existing inline data deduplication method investigates a data stream anew each time the method receives the data stream. In contrast, an embodiment can identify or receive the context information for all or part of a data stream, form groups of related data blocks, and reuse that knowledge of the context and grouping at a next occurrence of a similar data stream.

The illustrative embodiments are described with respect to certain workloads, processes, or operations only as examples. Such descriptions are not intended to be limiting on the invention. For example, an illustrative embodiment described with respect to a database backup operation can be implemented in conjunction with another operation within the scope of the illustrative embodiments.

Furthermore, the illustrative embodiments may be implemented with respect to any type of data, data source, or access to a data source over a data network. Any type of data application or storage device may provide the data, such as data for deploying or configuring an application, to an embodiment of the invention, either locally at a data processing system or over a data network, within the scope of the invention.

The illustrative embodiments are further described with respect to certain applications only as examples. Such descriptions are not intended to be limiting on the invention.

An embodiment of the invention may be implemented with respect to any type of application, such as, for example, applications that are served, the instances of any type of server application, a platform application, a stand-alone application, an administration application, or a combination thereof. An application, including an application implementing all or part of an embodiment, may further include data objects, code objects, encapsulated instructions, application fragments, services, and other types of resources available in a data processing environment. For example, a Java object, an Enterprise Java Bean (EJB), a servlet, or an applet may be manifestations of an application with respect to which the invention may be implemented. (Java and all Java-based trademarks and logos are trademarks or registered trademarks of Oracle Corporation and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
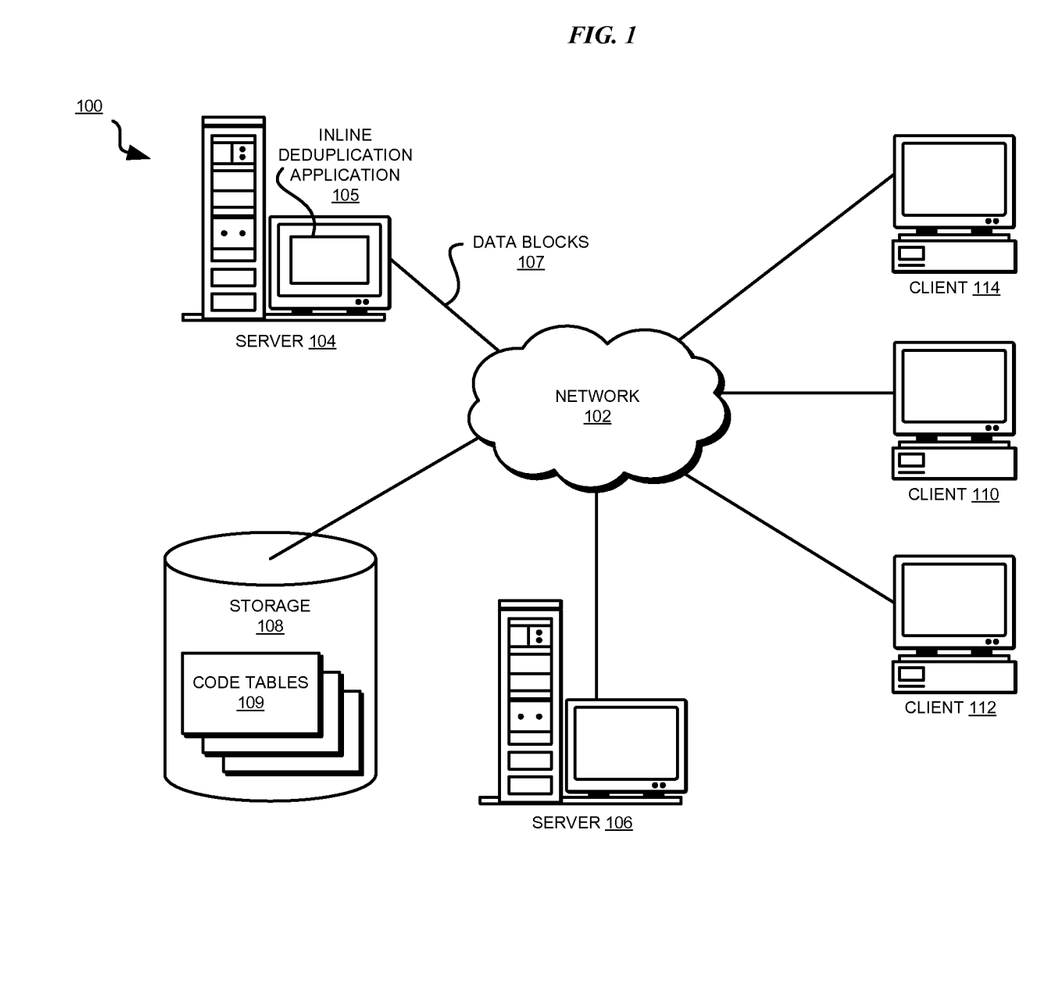
FIG. 1 depicts a pictorial representation of a network of data processing systems in which illustrative embodiments may be implemented.
Figure 2:
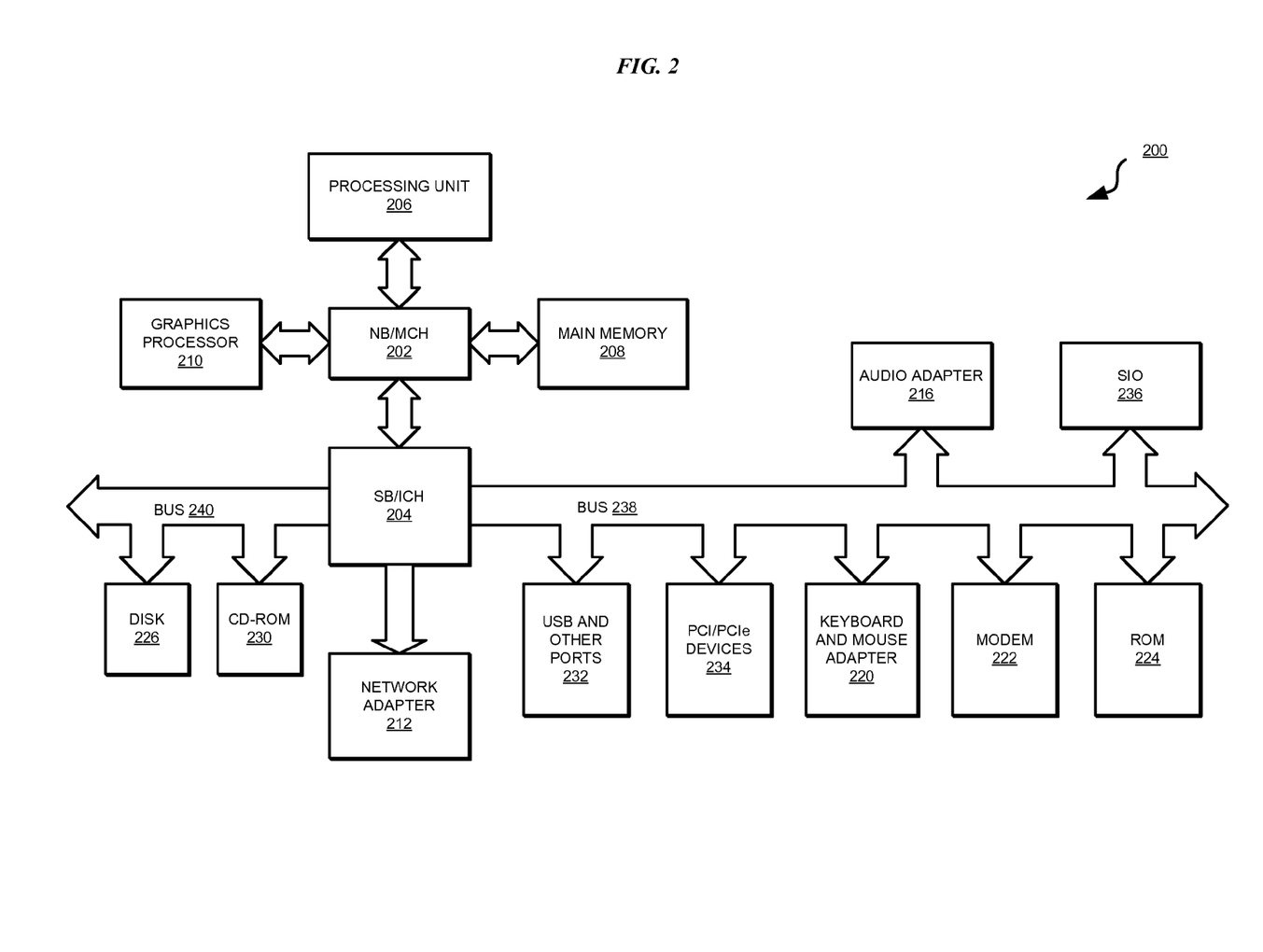
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include example inline data deduplication application 105, which implements an embodiment. Data blocks 107 are part of an data stream on which inline data deduplication application 105 operates using one or more code tables 109 stored in storage 108, as described herein. Code tables 109 are named or described as "tables" only as an example and without implying a limitation to a table data structure. The contents of code tables 109 can be organized in any data structure suitable for a given implementation within the scope of the illustrative embodiments.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client/server environment in which the illustrative embodiments may be implemented. A client/server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or any other suitable data processing device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java programming system, may run in conjunction with the operating system and provides calls to the operating system from Java programs or applications executing on data processing system 200.

Instructions for the operating system, the object-oriented programming system, and applications or programs, such as inline data deduplication application 105 in FIG. 1, are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
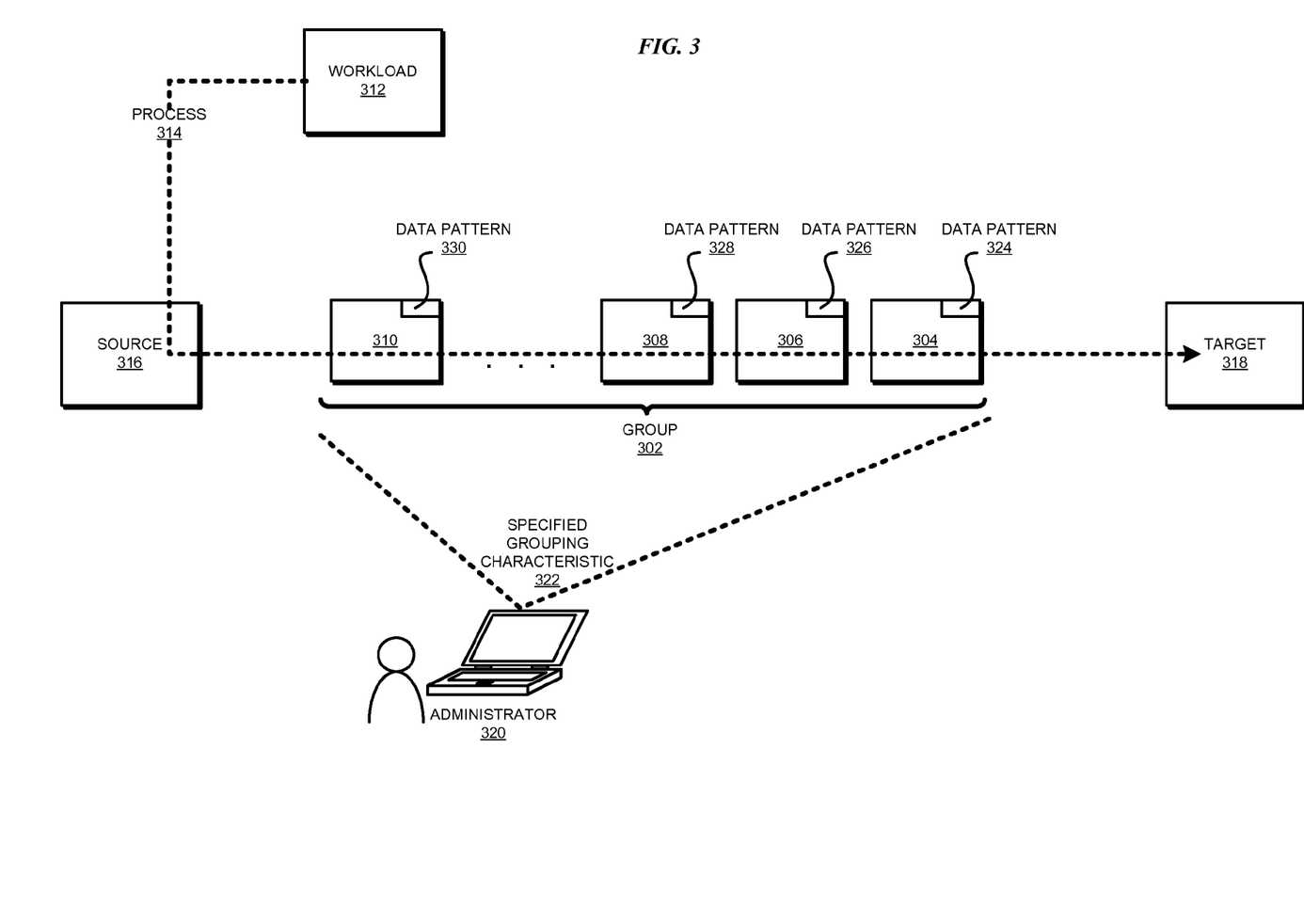
FIG. 3 depicts a block diagram of a variety of ways in which a grouping of data blocks or context for the data blocks can be detected or specified in accordance with an illustrative embodiment.

With reference to FIG. 3, this figure depicts a block diagram of a variety of ways in which a grouping of data blocks or context for the data blocks can be detected or specified in accordance with an illustrative embodiment. Data blocks in group 302 are analogous to data blocks 107 in FIG. 1. Group 302 include, for example, data blocks 304, 306, 308, and 310.

According to one embodiment, data blocks 304-310 share a common context, and therefore belong in group 302 because an improved inline data deduplication application, such as inline data deduplication application 105 in FIG. 1, detects that data blocks 304-310 are a result of workload 312 executing on a data processing system. According to another embodiment, data blocks 304-310 share a common context, and therefore belong in group 302 because an improved inline data deduplication application of the embodiment detects that data a process, process 314, has generated blocks 304-310. According to an embodiment, the improved inline data deduplication application of the embodiment further uses the information that process 314 is related to workload 312, in order to detect or modify the context.

According to another embodiment, data blocks 304-310 share a common context, and therefore belong in group 302 because an improved inline data deduplication application, such as inline data deduplication application 105 in FIG. 1, detects that data blocks 304-310 are a part of a data stream from source 316 to target 318, thus sharing a common source-target pair. According to another embodiment, data blocks 304-310 share a common context, and therefore belong in group 302 because a user, such as administrator 320, has specified grouping characteristic 322, which corresponds to data blocks 304-310 in group 302 in the given data stream.

According to another embodiment, data blocks 304-310 share a common context, and therefore belong in group 302 because data blocks 304, 306, 308, and 310 include data patterns 324, 326, 328, and 330, respectively, and data patterns 324-330 are related to one another according to a rule, policy, logic, or specification. For example, if data blocks 304-310 are a part of a data stream resulting from a database backup operation, data patterns 324-330 may be a common table name, different table names under a common database name, an organization identifier, or another pattern that is similar in some respect among data patterns 324-330.

The example methods of context detection or specification are provided only as examples for the clarity of the description and not to imply a limitation on the illustrative embodiments. Those of ordinary skill in the art will be able to recognize many other methods for detecting or specifying a context in a similar manner, and the same are contemplated within the scope of the illustrative embodiments.

Figure 4:
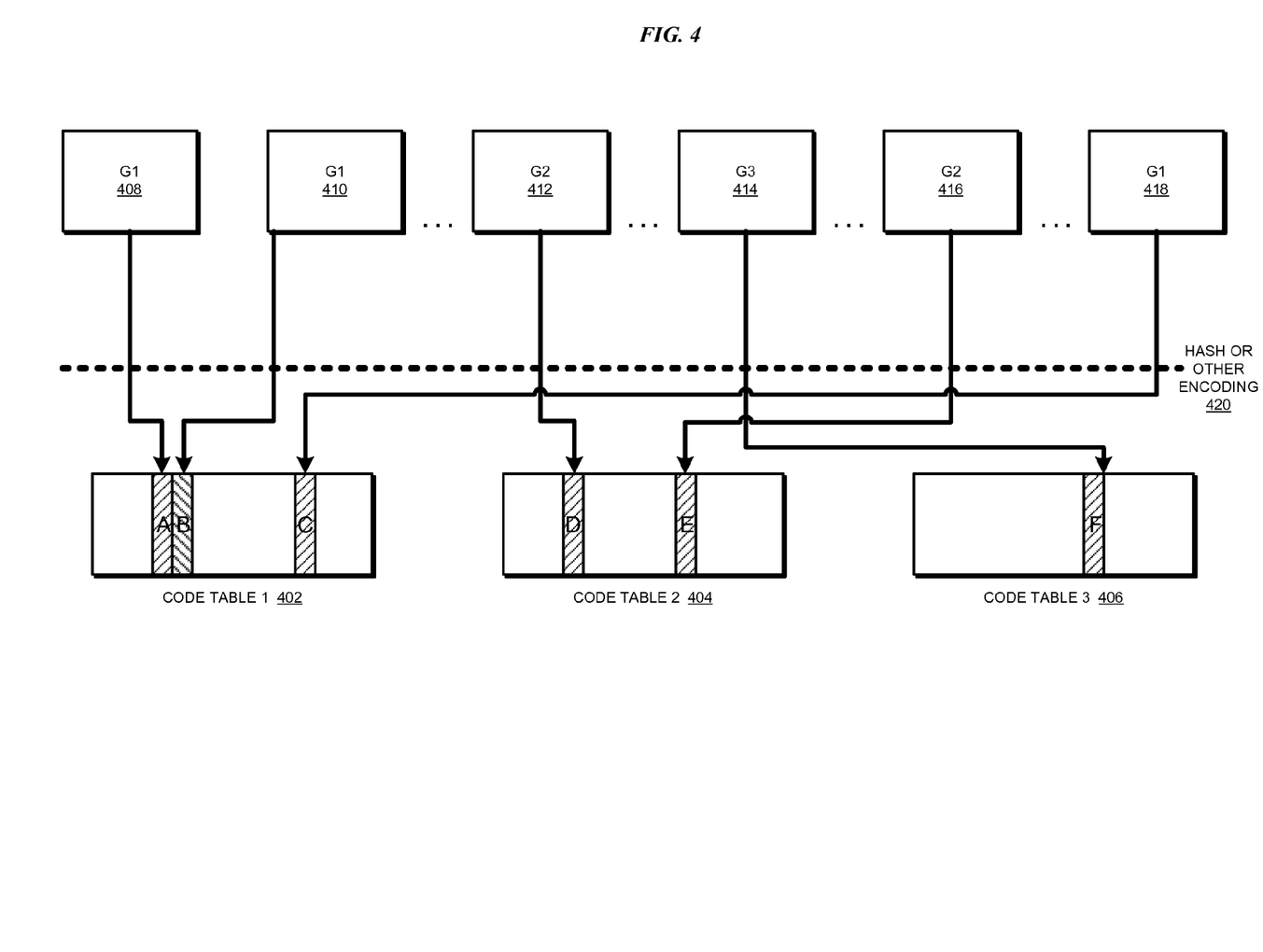
FIG. 4 depicts a block diagram of a process of a context aware inline data deduplication in accordance with an illustrative embodiment.

With reference to FIG. 4, this figure depicts a block diagram of a process of a context aware inline data deduplication in accordance with an illustrative embodiment. Code table 402, labeled "code table 1", Code table 404, labeled "code table 2", and Code table 406, labeled "code table 3", are similar to code tables 107 in FIG. 1.

For the purposes of describing an example operation of an embodiment, and without implying any limitations, assume that code tables 402-406 are only three example code tables from a collection of several code tables, for example a set of hundreds of code tables, which is not atypical for data deduplication in a typical data processing environment. Further assume that the data stream arriving at an improved data deduplication application, such as inline data deduplication application 105 in FIG. 1, includes data blocks 408, 410, 412, 416, 418, and 420. Through one or more of the context detection or specification methods described with respect to FIG. 3, the improved inline data deduplication groups data blocks 408, 410, and 418 into a group labeled "G1", data blocks 412 and 416 into a different group labeled "G2", and data block 414 into a different group labeled "G3".

An n-m relationship can exist between group labels and code tables. Accordingly, the improved inline data deduplication application associates a code table with one or more group labels, and vice versa. For example, the improved inline data dedupication associates group G1 with code table 1, group G2 with code table 2, and group G3 with code table 3.

Code tables hold a set of encoded values, where an encoded value corresponds to the contents of a data block. For example, and without implying a limitation thereto, an encoded value may be a hash value, obtained by hashing the contents of a data block. In such an example, a code table, such as code table 402 includes a set of hash values. In some embodiments, the improved inline data deduplication application generates the encoded values. In some embodiments, the improved inline data deduplication application creates the code tables, and in some embodiments, the improved inline data deduplication application stores the generated values in the code tables.

Any type of encoding, encryption, translation, compression, mapping, or a combination thereof, can be similarly used to produce codes and code tables within the scope of the illustrative embodiments. For example, checksum may be another type of code that can be computed for the contents of a data block and stored in a code table in a similar manner as described above with respect to hash values.

Assume, for example, that code tables 402-406 are already populated with respective sets of codes. For example, a previous data deduplication may have resulted in the creation of one or more code tables, including code tables 402, 404, or 406. As another example, a system may pre-compute codes for a set of data blocks, whether existing or contemplated. In an embodiment, an already populated code table can be modified or updated with new or different codes in a similar manner.

Having detected only the presence of data blocks belonging to groups G1, G2, and G3, the improved inline data deduplication application loads into memory only code tables 1, 2, and 3 from a significantly larger set of code tables that may exist in a repository. While processing data blocks 408-418 for inline data deduplication, the improved inline data deduplication application performs hashing or another encoding 420 on data blocks 408-418.

The improved inline data deduplication application matches the code computed for a data block with codes existing in a code table that corresponds to the group to which the data block belongs. For example, the improved inline data deduplication application attempts to match the code for data block 408, because data block 408 and code table 402 both correspond to group G1, and finds that the code for data block 408 matches code A in code table 402.

Similarly the improved inline data deduplication application matches the code for data block 410 to code B in code table 402; the code for data block 412 to code D in code table 404; and the code for data block 414 to code F in code table 406. To illustrate an operation of an embodiment, suppose data block 416 is new in the data stream in that data block 416 has not been encoded and recorded in a code table prior to the occurrence in the present data stream. Consequently, the improved inline data deduplication application fails to find a match for the code corresponding to data block 416 in code table 404. The improved inline data deduplication application modifies code table 404 by adding code E to code table 404.

To illustrate another operation of an embodiment, suppose data block 418 is new in the data stream in that data block 418 is a changed form of a previously seen data block. For example, the similarity between the contents of data block 418 and the contents of another data block previously coded and recorded in code table 402 exceeds a threshold. Consequently, the improved inline data deduplication application fails to find an exact match for the code corresponding to data block 418 in code table 408, but finds a code for the similar data block. The improved inline data deduplication application modifies code C in code table 404, such as by deleting the code of the similar data block and adding the code corresponding to data block 418 in code table 402.

Figure 5:
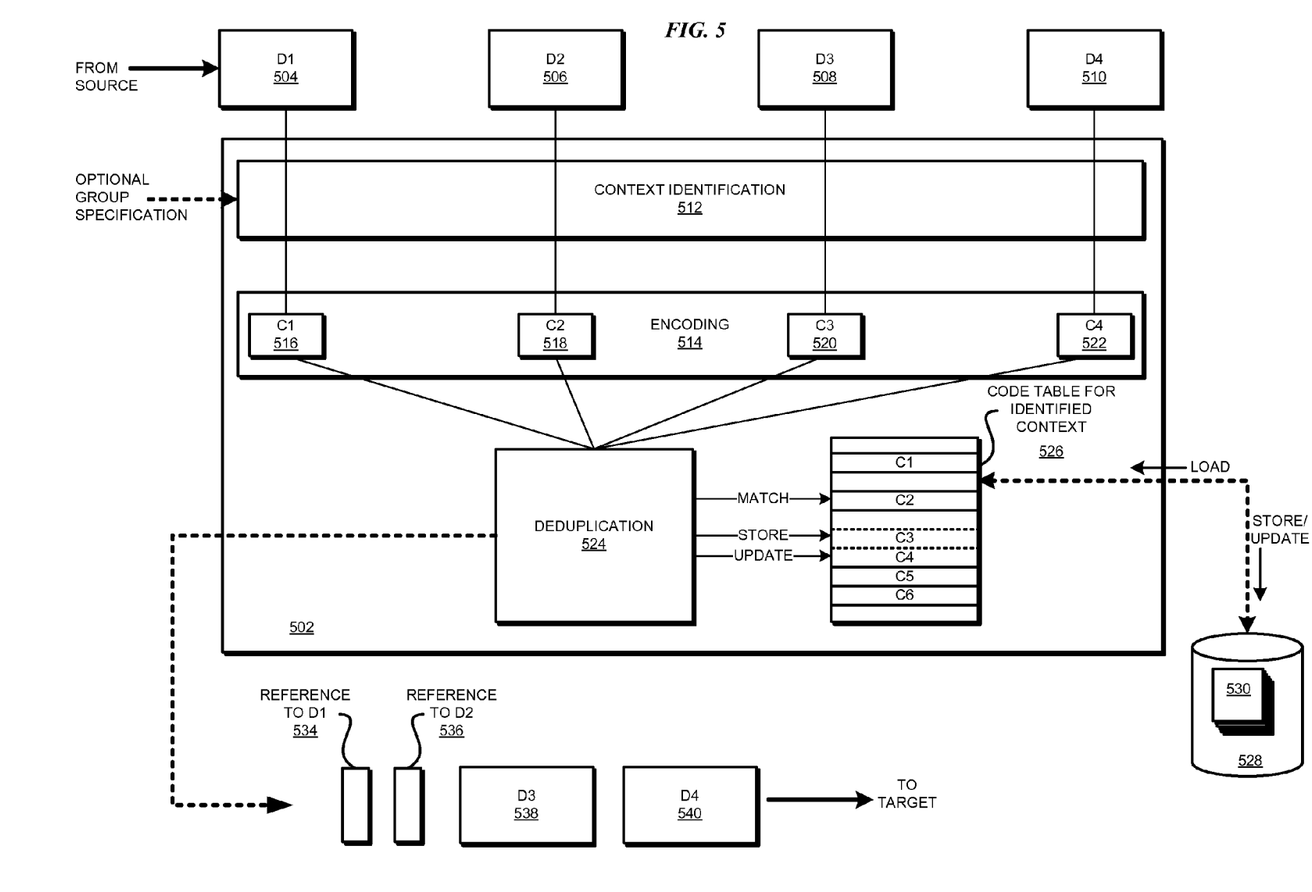
FIG. 5 depicts a block diagram of a context sensitive reusable inline data deduplication operation using an example configuration of an improved inline data deduplication application in accordance with an illustrative embodiment.

With reference to FIG. 5, this figure depicts a block diagram of a context sensitive reusable inline data deduplication operation using an example configuration of an improved inline data deduplication application in accordance with an illustrative embodiment. Improved inline data deduplication application 502 can be used as inline deduplication application 105 in FIG. 1, and for performing the operations described with respect to FIGS. 3 and 4.

Application 502 receives data blocks 504, 506, 508, and 510, labeled "D1", "D2", "D3", and "D4", respectively, in a data stream from a source. Context identification component 512 identifies a context for data blocks 504-510 by detecting a context in the manner of an embodiment described with respect to FIG. 3, by receiving an optional grouping specification from a user or system, or a combination thereof. Encoding component 514 encodes data blocks 504-510, for example by using a hashing algorithm on the contents of data blocks 504-510. Encoding component 514 generates code 516 labeled "C1" and corresponding to data block 504, code 518 labeled "C2" and corresponding to data block 506, code 520 labeled "C3" and corresponding to data block 508, and code 522 labeled "C4" and corresponding to data block 510.

Using the identified context from context identification component 512, deduplication component 524 selects and loads into memory, such as main memory 208 in FIG. 2, code table 526. Deduplication component 524 selects code table 526 from repository 528 that holds set of code tables 530. Repository 528 with set of code tables 530 is analogous to storage 108 with code tables 107 in FIG. 1.

Deduplication component 524 uses codes C1, C2, C3, and C4 to perform a combination of matching, storing, or updating operations on code table 526. For example, deduplication component 524 finds that codes C1 and C2 match with corresponding codes C1 and C2 stored in code table 526, code C3 has to be stored as a new addition to code table 526, and code C4 in code table 526 has to be updated with new code C4 computed as code 522.

Based on the matching of code C1 in code table 526, as described in the above example, deduplication component 524 replaces data block 504 with reference 534 to an instance of D1 stored or found elsewhere. Similarly, based on the matching results of codes C2, C3, and C4 in code table 526, as described in the above example, deduplication component 524 replaces data block 506 with reference 536 to an instance of D2 stored or found elsewhere, and lets data blocks 508 and 510 pass through to a target as data blocks 538 and 540. At some point in time, such as after the data stream from the source has terminated, application 502 stores or updates code table 526 back to repository 528.

Figure 6:
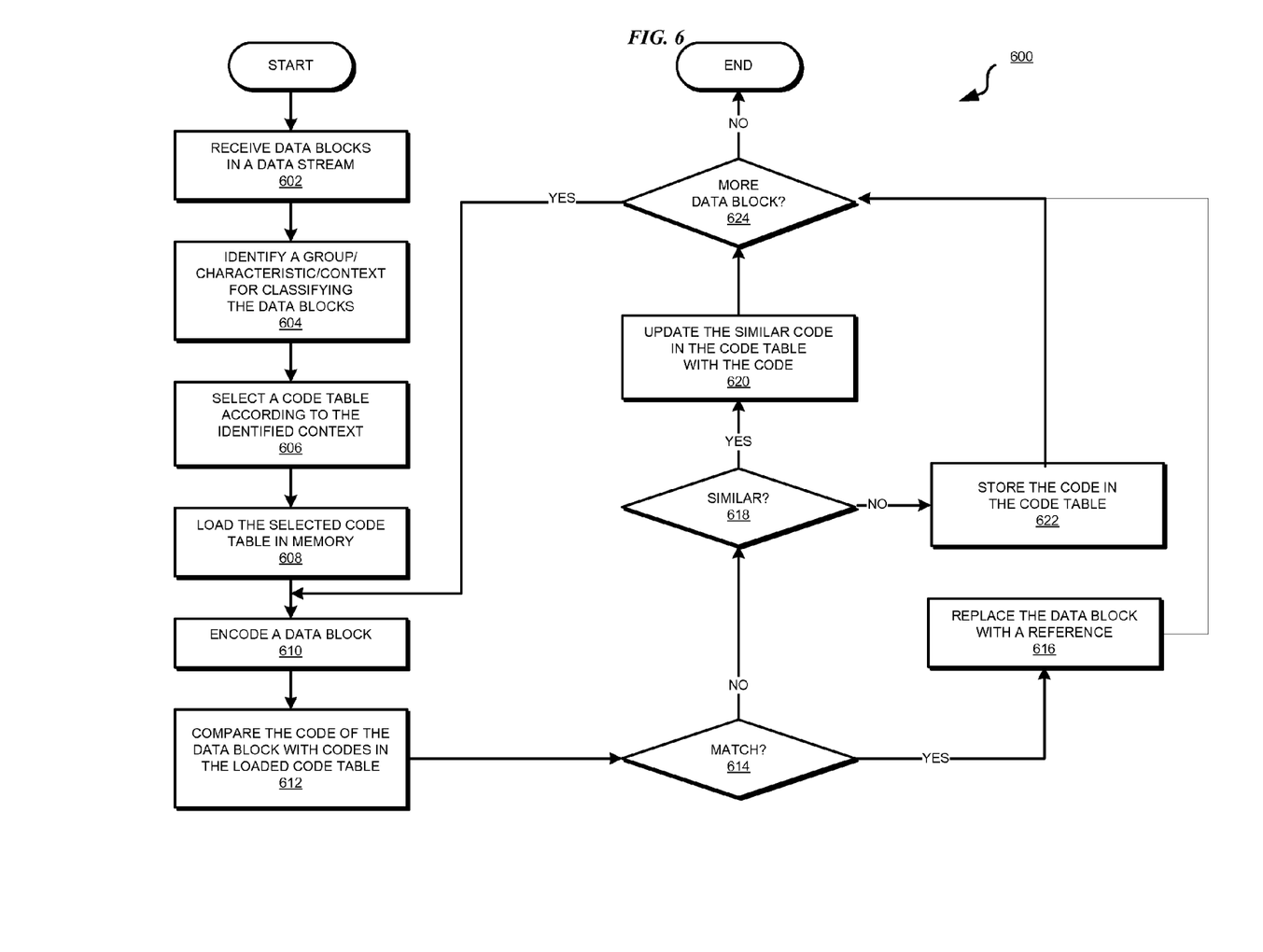
FIG. 6 depicts a flowchart of an example process of context sensitive reusable inline data deduplication in accordance with an illustrative embodiment.

With reference to FIG. 6, this figure depicts a flowchart of an example process of context sensitive reusable inline data deduplication in accordance with an illustrative embodiment. Process 600 can be implemented in an improved inline data deduplication application, such as application 502 in FIG. 5.

The improved inline data deduplication application receives a set of one or more data blocks in a data stream (block 602). The application identifies one or more groups, common characteristics, or contexts in the set of data blocks (block 604).

The application selects a set of one or more code tables from a repository of code tables using the one or more identified groups, characteristics, or contexts (block 606). The application loads the selected set of code tables in memory of a data processing system (block 608).

The application encodes a data block from the set of data blocks (block 610). The application compares the code of the encoded data block with one or more codes in the set of code tables loaded in memory (block 612). The application determines whether the code of the encoded data block matches a code in the set of code tables in memory (block 614). If the code matches ("Yes" path of block 614), the application replaces the data block with a reference to an instance of the data block elsewhere (block 616). The application proceeds to execute block 624 thereafter.

If the code does not match ("No" path of block 614), the application determines whether the code indicates that the data block is similar to another data block whose code exists in a code table in memory (block 618). If the code is similar ("Yes" path of block 618), the application updates the similar code in the code table with the code computed at block 610 (block 620). The application proceeds to execute block 624 thereafter. If the code does not indicate a similarity ("No" path of block 618), the application stores the code in a code table in memory (block 622).

The application determines whether more data blocks have to be encoded and deduplicated in this manner (block 624). If more data blocks remain to be deduplicated ("Yes" path go block 624), the application proceeds to execute process 600 from block 610 relative to another data block received in the data stream at block 602. If no more data blocks remain to be deduplicated ("No" path go block 624), process 600 ends thereafter.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a method, system, and computer program product are provided in the illustrative embodiments for context sensitive reusable inline data deduplication. An embodiment saves expensive memory space by avoiding loading all deduplication codes into memory. An embodiment creates a set of code tables, each code table including a subset of available codes for deduplication. An embodiment loads a subset of the code tables depending upon an identified context in the data blocks of a data stream, thereby reusing deduplication codes in a context sensitive manner. An embodiment encodes the data blocks and matches the resulting codes in the loaded code tables. An embodiment replaces the data blocks whose codes match corresponding codes in a loaded code table. An embodiment stores new or changed codes in one or more loaded code tables, thereby keeping the codes and code tables current and reusable for deduplicating future data streams.

Thus, an embodiment advantageously reduces deduplication misses during inline data deduplication, while reducing memory costs of data deduplication, and avoiding degraded performance from referencing codes stored in slow storage devices. Furthermore, an embodiment can be adapted to receive instructions from a system or user to pre-associate a set of codes with a context. An embodiment can also be adapted to associate one or more data blocks with a particular group or context, indefinitely, for a specified duration, or subject to certain frequency of the data block's occurrence in a data stream.

An embodiment can also be adapted to consider a specific portion of a data block for identifying a context of the data block. For example, a name field or a tag in the data block, a name field or a tag accompanying the data block, an identity of a source of the data block, a port via which the data block is sent from a source or arrives at a target, a volume name or logical address to which the data block is requested to be written, or a combination of these and other features can be specified for identifying the data block's context.

As a priming action, an embodiment can further allow code tables to be updated without a data stream but occasionally based on the stored content of a storage device. An embodiment can also allow code tables to be updated without a data stream but with pre-computed codes relating to existing or contemplated data blocks. Such an adaptation is particularly useful for deduplicating data streams for workloads that read a set of data blocks and later perform writes of the same data blocks to a different location, as occurs in backup, copying, and archiving activities.

An embodiment can also be adapted to omit deduplicating certain data blocks even if those data blocks repeat in a data stream or are substantially similar to previously seen data blocks. Such an adaptation is particularly useful when the data stream includes log files or log records with substantially similar content but only different time stamps or identifiers.

An embodiment can also be adapted to apply any of the above described enhancements or properties of a data block to a collection of data blocks. An embodiment can also be adapted to preserve any of the above described enhancements or properties of a data block when the contents of the data block are copied to a new data block or data structure. Of course, an embodiment can be used in conjunction the other data processing environment operations. For example, a repository of code tables can be saved, selected, backed up, restored, or otherwise administrated in a manner similar to similar operations on other data in a data processing environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer-readable tangible storage device," "computer-readable storage device," and computer-readable storage device" do not encompass a signal propagation medium such as a copper cable, optical fiber, or wireless transmission medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), or a mobile ad hoc network (MANET), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational blocks to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, a set includes one or more members unless the context indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for inline deduplication of data, the method comprising:
    a computer comparing a first content of a first data block in a subset of a set of data blocks with a second content of a second data block in the subset, the set of data blocks being included in a data stream, the data stream being in transit from a source to a destination;
    the computer determining a basis of a relationship between the first data block and the second data block, wherein determining said basis comprises determining that a portion of the first content matches a portion of the second content, and wherein the determined basis forms a context shared by the subset of the set of data blocks;
    the computer selecting a code data structure from a set of code data structures using the context, wherein the context is associated with the code data structure, and wherein the code data structure includes a set of codes;
    the computer loading into a memory the code data structure from the set of code data structures;
    the computer determining that a second code data structure from the set of code data structures unrelated to the context is not to be loaded into the memory;
    the computer computing, for the first data block in the subset of data blocks, a code corresponding to a content of the first data block;
    the computer determining whether the code corresponding to the content of the first data block matches a stored code in the code data structure;
    the computer replacing, responsive to the code corresponding to the content of the first data block matching the stored code, the first data block with a reference to an instance of the first data block; and
    the computer causing the reference to be stored in a target data processing system.

2. The method of claim 1, further comprising:
    the computer computing, for a third data block in the subset of data blocks, a code corresponding to a content of the third data block;
    the computer determining whether the code corresponding to the content of the third data block matches a second stored code in the code data structure;
    the computer storing, responsive to the code corresponding to the content of the third data block not matching the second stored code, the code corresponding to the content of the third data block in the code data structure;
    the computer allowing, responsive to the code corresponding to the content of the third data block not matching the second stored code, the third data block to pass to the target data processing system.

3. The method of claim 1, further comprising:
    the computer computing, for a third data block in the subset of data blocks, a code corresponding to a content of the third data block;
    the computer determining whether a comparison of the code corresponding to the content of the third data block with a third stored code in the code data structure indicates that the third data block is similar within a threshold degree to an other data block corresponding to the third stored code;
    the computer updating, responsive to the third data block being similar within the threshold degree to the other data block, the third stored code in the code data structure with the code corresponding to the content of the third data block;
    the computer allowing, responsive to the third data block being similar within the threshold degree to the other data block, the third data block to pass to the target data processing system.

4. The method of claim 1, wherein the instance of the first data block is present in the set of data blocks.

5. The method of claim 1, wherein the instance of the first data block is stored in a data storage device.

6. The method of claim 1, wherein the set of code data structures is stored in a repository prior to a source data processing system transmitting the set of data blocks, wherein a code data structure in the set of code data structures is populated with a set of codes corresponding to a second set of data blocks sent prior to the set of data blocks, and wherein the second set of data blocks is capable of populating the code data structure.

7. The method of claim 1, wherein the set of codes includes a code that is pre-computed based on a data block stored in a data storage device.

8. The method of claim 1, wherein the set of codes includes a code that is pre-computed based on an expected data block.

9. The method of claim 1, further comprising:
    the computer directing the determining the basis of the relationship to a specific part of the first data block, and wherein the specific part of the first data block includes a data pattern that is common to the subset of data blocks.

10. The method of claim 1, further comprising:
    the computer receiving the context from a user.

11. The method of claim 1, wherein the first code is a hash value of the content of the first data block.

12. A computer program product comprising one or more computer-readable, hardware storage devices and computer-readable program instructions which are stored on the one or more storage devices and when executed by one or more processors, perform the method of claim 1.

13. A computer system comprising one or more processors, one or more computer-readable memories, one or more computer-readable, hardware storage devices and program instructions which are stored on the one or more storage devices for execution by the one or more processors via the one or more memories and when executed by the one or more processors perform the method of claim 1.

14. A computer program product for inline deduplication of data, the computer program product comprising:
    one or more computer-readable hardware storage devices;
    program instructions, stored on at least one of the one or more storage devices, to compare a first content of a first data block in a subset of a set of data blocks with a second content of a second data block in the subset, the set of data blocks being included in a data stream, the data stream being in transit from a source to a destination;
    program instructions, stored on at least one of the one or more storage devices, to determine a basis of a relationship between the first data block and the second data block, wherein the program instructions to determine the basis comprise program instructions to determine that a portion of the first content matches a portion of the second content, and wherein the determined basis forms a context shared by the subset of the set of data blocks;

program instructions, stored on at least one of the one or more storage devices, to select a code data structure from a set of code data structures using the context, wherein the context is associated with the code data structure, and wherein the code data structure includes a set of codes;

program instructions, stored on at least one of the one or more storage devices, to load into a memory the code data structure from the set of code data structures;

program instructions, stored on at least one of the one or more storage devices, to determine that a second code data structure from the set of code data structures unrelated to the context is not to be loaded into the memory;

program instructions, stored on at least one of the one or more storage devices, to compute, for the first data block in the subset of data blocks, a code corresponding to a content of the first data block;

program instructions, stored on at least one of the one or more storage devices, to determine whether the code matches a stored code in the code data structure;

program instructions, stored on at least one of the one or more storage devices, to replace, responsive to the code matching the stored code, the first data block with a reference to an instance of the first data block; and program instructions, stored on at least one of the one or more storage devices, to cause the reference to be stored in a target data processing system.

15. The computer program product of claim 14, further comprising:

program instructions, stored on at least one of the one or more storage devices, to compute, for a third data block in the subset of data blocks, a code corresponding to a content of the third data block;

program instructions, stored on at least one of the one or more storage devices, to determine whether the code corresponding to the third data block matches a second stored code in the code data structure;

program instructions, stored on at least one of the one or more storage devices, to store, responsive to the code corresponding to the third data block not matching the second stored code, the code corresponding to the third data block in the code data structure;

program instructions, stored on at least one of the one or more storage devices, to allow, responsive to the code corresponding to the third data block not matching the second stored code, the third data block to pass to the target data processing system.

16. The computer program product of claim 14, wherein the program instructions to compare, the program instructions to determine the basis of the relationship, the program instructions to select, the program instructions to load, the program instructions to determine that the second code data structure is not to be loaded into the memory, the program instructions to compute, the program instructions to determine whether the code matches, the program instructions to replace, and the program instructions to cause are stored in at least one of the one or more computer-readable tangible storage devices in a data processing system, and wherein the program instructions to compare, the program instructions to determine the basis of the relationship, the program instructions to select, the program instructions to load, the program instructions to determine that the second code data structure is not to be loaded into the memory, the program instructions to compute, the program instructions to determine whether the code matches, the program instructions to replace, and the program instructions to cause are transferred over a network from a remote data processing system.

17. The computer program product of claim 14, wherein, the program instructions to compare, the program instructions to determine the basis of the relationship, the program instructions to select, the program instructions to load, the program instructions to determine that the second code data structure is not to be loaded into the memory, the program instructions to compute, the program instructions to determine whether the code matches, the program instructions to replace, and the program instructions to cause are stored in at least one of the one or more computer-readable hardware storage devices in a server data processing system, and wherein, the program instructions to compare, the program instructions to determine the basis of the relationship, the program instructions to select, the program instructions to load, the program instructions to determine that the second code data structure is not to be loaded into the memory, the program instructions to compute, the program instructions to determine whether the code matches, the program instructions to replace, and the program instructions to cause are downloaded over a network to a remote data processing system for use in a computer-readable hardware storage device associated with the remote data processing system.

18. A computer system for inline deduplication of data, the computer system comprising:

one or more processors, one or more computer-readable memories and one or more computer-readable hardware storage devices;

program instructions, stored on at least one of the one or more storage devices for execution by at least one of the one or more processors via at least one of the one or more memories, to compare a first content of a first data block in a subset of a set of data blocks with a second content of a second data block in the subset, the set of data blocks being included in a data stream, the data stream being in transit from a source to a destination;

program instructions, stored on at least one of the one or more storage devices for execution by at least one of the one or more processors via at least one of the one or more memories, to determine a basis of a relationship between the first data block and the second data block, wherein the program instructions to determine the basis comprise program instructions to determine that a portion of the first content matches a portion of the second content, and wherein the determined basis forms a context shared by the subset of the set of data blocks;

program instructions, stored on at least one of the one or more storage devices for execution by at least one of the one or more processors via at least one of the one or more memories, to select a code data structure from a set of code data structures using the context, wherein the context is associated with the code data structure, and wherein the code data structure includes a set of codes;

program instructions, stored on at least one of the one or more storage devices for execution by at least one of the one or more processors via at least one of the one or more memories, to load into a memory the code data structure from the set of code data structures;

program instructions, stored on at least one of the one or more storage devices for execution by at least one of the one or more processors via at least one of the one or more memories, to determine that a second code data structure from the set of code data structures unrelated to the context is not to be loaded into the memory;

program instructions, stored on at least one of the one or more storage devices for execution by at least one of the one or more processors via at least one of the one or more memories, to compute, for the first data block in the subset of data blocks, a first code corresponding to a content of the first data block;

program instructions, stored on at least one of the one or more storage devices for execution by at least one of the one or more processors via at least one of the one or more memories, to determine whether the first code matches a stored code in the code data structure;

program instructions, stored on at least one of the one or more storage devices for execution by at least one of the one or more processors via at least one of the one or more memories, to replace, responsive to the first code matching the stored code, the first data block with a reference to an instance of the first data block; and program instructions, stored on at least one of the one or more storage devices for execution by at least one of the one or more processors via at least one of the one or more memories, to cause the reference to be stored in a target data processing system.

* * * * *